（12）United States Patent
Okazaki

(10) Patent No.: US 10,252,573 B2
(45) Date of Patent: Apr. 9, 2019

(54) PNEUMATIC TIRE

(71) Applicant: BRIDGESTONE CORPORATION, Tokyo (JP)

(72) Inventor: Naoto Okazaki, Kodaira (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 252 days.

(21) Appl. No.: 15/110,475

(22) PCT Filed: Jan. 16, 2015

(86) PCT No.: PCT/JP2015/000168
§ 371 (c)(1),
(2) Date: Jul. 8, 2016

(87) PCT Pub. No.: WO2015/122116
PCT Pub. Date: Aug. 20, 2015

(65) Prior Publication Data
US 2016/0325588 A1   Nov. 10, 2016

(30) Foreign Application Priority Data
Feb. 13, 2014   (JP) ................................. 2014-025527

(51) Int. Cl.
*B60C 3/04*   (2006.01)
*B60C 9/02*   (2006.01)
(Continued)

(52) U.S. Cl.
CPC .............. *B60C 9/0292* (2013.01); *B60C 3/04* (2013.01); *B60C 13/003* (2013.01); *B60C 15/0027* (2013.01); *B60C 2200/06* (2013.01)

(58) Field of Classification Search
CPC ........... B60C 9/02; B60C 9/0292; B60C 3/00; B60C 3/04
See application file for complete search history.

(56) References Cited

U.S. PATENT DOCUMENTS 4,282,918 A * 8/1981 Tomoda .................... B60C 3/04
152/454

FOREIGN PATENT DOCUMENTS

| CN | 105829129 A | 8/2016 |
|---|---|---|
| EP | 0533085 A1 | 3/1993 |

(Continued)

OTHER PUBLICATIONS

International Search Report for PCT/JP2015/000168 dated Apr. 21, 2015.

*Primary Examiner* — Justin R Fischer
(74) *Attorney, Agent, or Firm* — Sughrue Mion, PLLC

(57) ABSTRACT

A tire, wherein, in a cross section in the tire width direction thereof in a state where the tire has substantially not been inflated with no load applied thereon, provided that the maximum height in the tire radial direction of the carcass is h, a radius of curvature of the carcass within a height range 0.91 h-h measured from the radially innermost position of the carcass is R7, an acute inclination angle specifically defined in the height range 0.91 h-h is θ7, the intermediate value of a radius of curvature in the height range 0.82 h-0.91 h is R6, a radius of curvature in the height range 0.63 h-0.82 h is R5, and an acute inclination angle specifically defined in the height range 0.63 h-0.82 h is θ5, R7≥0.26h, θ7≥14°, R6<R7, R5>R6, and θ5≤23°.

3 Claims, 2 Drawing Sheets

(51) Int. Cl.
 *B60C 15/00* (2006.01)
 *B60C 13/00* (2006.01)

(56) References Cited

FOREIGN PATENT DOCUMENTS

| | | |
|---|---|---|
| EP | 3088210 A1 | 11/2016 |
| JP | 59-75807 A | 4/1984 |
| JP | 2-88304 A | 3/1990 |
| JP | 4-129803 A | 4/1992 |
| JP | 7276928 A | 10/1995 |
| JP | 11-227410 A | 8/1999 |
| JP | 2013-10433 A | 1/2013 |
| JP | 2013-79018 A | 5/2013 |

\* cited by examiner

PNEUMATIC TIRE

CROSS REFERENCE TO RELATED APPLICATIONS

This application is a National Stage of International Application No. PCT/JP2015/000168 filed Jan. 16, 2015, claiming priority based on Japanese Patent Application No. 2014-025527 filed Feb. 13, 2014, the contents of all of which are incorporated herein by reference in their entirety.

TECHNICAL FIELD

The present invention relates to a pneumatic tire.

BACKGROUND ART

There is conventionally known, as a pneumatic tire for a heavy-load vehicle such as a truck, a bus and the like, a tire having a textile carcass ply of a bias structure provided on the inner side of a steel carcass ply of a radial structure, to enhance rigidity of each sidewall portion to improve controllability and stability of the tire (e.g. PTL 1).

CITATION LIST

Patent Literature

PTL 1: JP 04-129803

SUMMARY

However, there has been a demand for a low fuel consumption tire in recent years in respective pneumatic tires including a pneumatic tire for a heavy-load vehicle, and making the structure of a tire simple and reducing the tire weight in particular to decrease rolling resistance of the tire are considered to be effective solutions for meeting the demand. The aforementioned technology of PTL 1 is then not preferable in terms of reducing tire weight, although the technology improves controllability and stability of a tire to some extent by additional provision of the textile carcass ply. In this connection, we also have to take into account that, if a tire is carelessly made lighter, rigidity of each sidewall portion and thus a lateral spring constant of the tire decrease, for example, which will cause the tire to be significantly displaced in the tire width direction when the tire is imparted with a slip angle in a cornering situation or the like of a vehicle, so that it takes a longer time for cornering force to diminish to a normal state, i.e. responsiveness of the vehicle in a cornering situation deteriorates. Further, an increase in displacement in the tire width direction of a tire makes a ground-contact configuration of the tire resemble that observed when the tire is imparted with a camber angle, thereby preventing shearing force from being uniformly generated within the ground-contact surface of the tire and thus decreasing cornering force, so that a larger steering angle will be needed in order to obtain cornering force necessitated for making a turn. The aforementioned two resulting phenomena may possibly deteriorate control lability and stability of the tire.

The present disclosure aims at solving the problems described above and an object thereof is to provide a pneumatic tire capable of improving controllability and stability thereof without requiring provision of an additional member.

Specifically a pneumatic tire having a pair of bead portions, a pair of bead cores embedded in the bead portions, respectively, and a carcass including at least one layer of carcass ply extending in a toroidal shape across the pair of bead cores, wherein:

in a cross section in the tire width direction of the tire in a state where the tire has been assembled with a prescribed rim but substantially has not been inflated, with no load applied thereon, provided that the maximum height in the tire radial direction of the carcass is h and that positions distanced on the outer side in the tire radial direction from the innermost position in the tire radial direction of the carcass by h, 0.91 h, 0.82 h, and 0.63 h, respectively, are a $7^{th}$ height position H7, a $6^{th}$ height position H6, a $5^{th}$ height position H5, and a $4^{th}$ height position H4, respectively, further provided that a radius of curvature of the carcass within a $7^{th}$ height range h7 ranging from the $6^{th}$ height position H6 to the $7^{th}$ height position H7 is R7, R7≥0.26 h;

further provided that an imaginary point on the carcass at the $6^{th}$ height position H6 is P6, an imaginary point on the carcass at a tire widthwise position distanced by 0.4 h on the inner side in the tire width direction from the outermost position in the tire width direction of the carcass is $P_{0.4\,h}$, a line linking the imaginary points P6 and $P_{0.4\,h}$ is L7, and an acute inclination angle formed by the line L7 with respect to the tire width direction is θ7, θ7≥14°;

further provided that the intermediate value of a radius of curvature of the carcass within a $6^{th}$ height range h6 ranging from the $5^{th}$ height position H5 to the 6th height position H6 is R6, R6<R7;

further provided that a radius of curvature of the carcass within a $5^{th}$ height range h5 ranging from the $4^{th}$ height position H4 to the $5^{th}$ height position H5 is R5, R5>R6; and further provided that a line linking the innermost and the outermost positions in the tire radial direction, on the carcass, in the $5^{th}$ height range h5 is L5 and an acute inclination angle formed by the line L5 with respect to the tire radial direction is θ5, θ5≤23°.

According to this tire, controllability and stability are improved without necessity of provision of an additional member.

In this connection, a "prescribed rim" represents a standard rim prescribed for each tire by an industrial standard which is valid in an area where the tire is manufactured and used, and examples thereof include: a standard rim in "JATMA Year Book" of JATMA (The Japan Automobile Tyre Manufacturers Association, Inc.) in Japan; a "Measuring Rim" in "STANDARDS MANUAL" of ETRTO (European Tyre and Rim Technical Organisation) in Europe; and a "Design Rim" in "Year Book" of TRA (TIE TIRE and RIM ASSOCIATION INC.) in the United States.

It is preferable that the intermediate value of a radius of curvature of the carcass within the $6^{th}$ height range h6 is in the range of 0.13 h to 0.26 h in the pneumatic tire of the present disclosure. Controllability and stability of the tire can be more reliably improved, with ensuring good durability thereof, by this structure.

It is preferable that a radius of curvature of the carcass within the $5^{th}$ height range h5 is ≥0.82 h in the pneumatic tire of the present disclosure. Controllability and stability of the tire can be further improved by this structure.

Provided that a position distanced on the outer side in the tire radial direction from the innermost position in the tire radial direction of the carcass by 0.48 h is a $3^{rd}$ height position H3 and that a radius of curvature of the carcass within a $4^{th}$ height range h4 ranging from the $3^{rd}$ height position H3 to the $4^{th}$ height position H4 is R4, it is preferable that R4≥0.39 h and the maximum width position of the carcass is located within the $4^{th}$ height range h4. Controllability and stability of the tire can be further improved by this structure.

According to the tire of the present disclosure, it is possible to provide a pneumatic tire capable of improving controllability and stability thereof without requiring provision of an additional member therein.

DETAILED DESCRIPTION

An embodiment of the present disclosure will be demonstratively described hereinafter with reference to the drawings.

Figure 1:
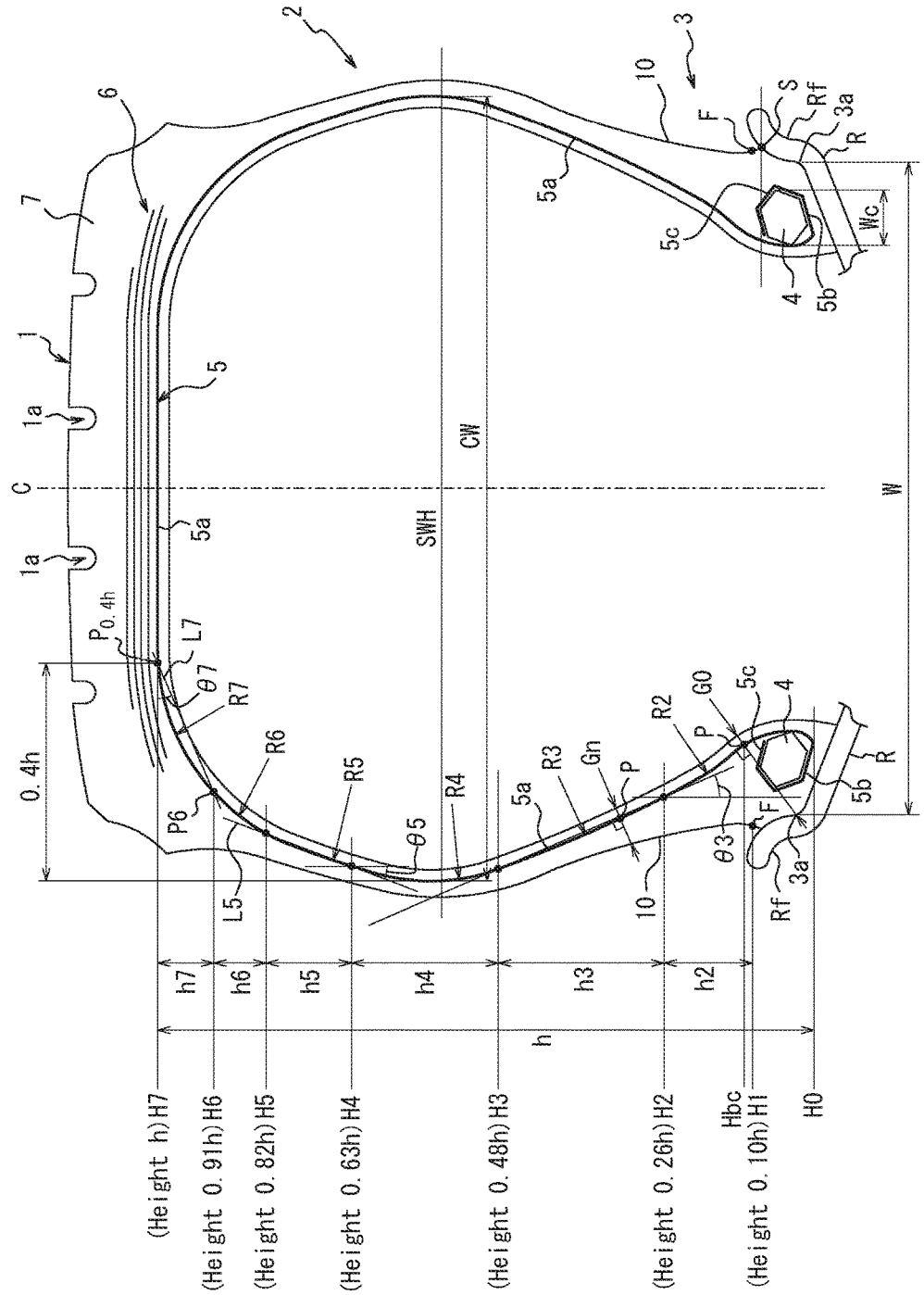
FIG. 1 is a cross sectional view in the tire width direction, showing an embodiment of a pneumatic tire according to the present disclosure.

FIG. 1 shows an embodiment of our pneumatic tire (which tire may occasionally be referred to simply as "tire" hereinafter). Although the tire described by the present embodiment is particularly suitable for use as a pneumatic tire for a heavy-load vehicle such as a truck, a bus and the like, the tire is also applicable to pneumatic tires for use in vehicles of other types. The tire is structured to be symmetrical with respect to a tire equatorial plane C in an example shown in FIG. 1 but may be structured to be asymmetrical with respect to the tire equatorial plane C.

The tire shown in FIG. 1 has a tread portion 1, a pair of sidewall portions 2 extending from respective end portions in the tire width direction of the tread portion 1 toward the inner side in the tire radial direction, and a pair of bead portions 3 provided on the inner side in the tire radial direction of the respective sidewall portions 2 to be continuous therewith. The tire further has: a pair of bead cores 4 embedded in the bead portions 3, respectively, and each having a hexagonal cross section in FIG. 1; and a carcass 5 including at least one layer (one layer in the example of FIG. 1) of carcass ply (having a radial structure in the example of FIG. 1) extending in a toroidal shape across the bead cores 4. The carcass ply is formed by coating cords made of steel, organic fibers, or the like, with rubber. The carcass 5 has a main body 5a extending in a toroidal shape across the bead cores 4 and a pair of turn-up portions 5b respectively extending from ends of the main body 5a to be turned up from the inner side toward the outer side in the tire width direction around the bead cores 4 in the example of FIG. 1. A belt 6 constituted of a plurality of belt layers and a tread rubber 7 are provided in the tread portion 1 in this order on the outer side in the tire radial direction of a crown region of the carcass 5. A tread pattern including, e.g. a plurality of circumferential grooves 1a extending in the tire circumferential direction, is formed at a tire outer surface of the tread rubber 7.

Hereinafter, dimensions and configurations of our tire in a cross section in the tire width direction of the tire in a state where the tire has been assembled with a prescribed rim R but substantially has not been inflated, with no load applied thereon, will be described unless mentioned otherwise. The state where "the tire substantially has not been inflated" represents a state where the tire has been inflated at the minimum, very low internal pressure, e.g. 30-50 kpa, which narrowly allows the tire to sustain the load of its own weight to somehow maintain the configuration of a tire-rim assembly. It should be noted that FIG. 1 is drawn, for convenience' sake, without meticulously considering difference in tire configuration between a case where the tire has been assembled with a prescribed rim R and inflated at the normal maximum internal pressure with no load applied thereon and a case where the tire has been assembled with a prescribed rim R but substantially has not been inflated, with no load applied thereon. "The normal maximum internal pressure" represents the air pressure corresponding to the maximum loading capacity prescribed for each size and/or ply rating by the aforementioned JATMA YEAR BOOK or the like.

The maximum height in the tire radial direction of the carcass 5 (measured from the innermost position H0 in the tire radial direction thereof) will be referred to as h, and positions distanced on the outer side in the tire radial direction from the innermost position H0 in the tire radial direction of the carcass 5 by h, 0.91 h, 0.82 h, and 0.63 h, respectively, will be referred to as a $7^{th}$ height position 1-17, a $6^{th}$ height position H16, a 5th height position H5, and a $4^{th}$ height position H4, respectively, as shown in FIG. 1. On this basis, in the tire of the present disclosure, it is essentially required that: further provided that a radius of curvature of the carcass 5 within a 7th height range h7 ranging from the $6^{th}$ height position H6 to the $7^{th}$ height position H7 is R7, R7≥0.26 h; further provided that an imaginary point on the carcass 5 at the $6^{th}$ height position H6 is P6, an imaginary point on the carcass at a tire widthwise position distanced by 0.4 h on the inner side in the tire width direction from the outermost position in the tire width direction of the carcass is $P_{0.4\ h}$, a line linking the imaginary points P6 and $P_{0.4\ h}$ is L7, and an acute inclination angle formed by the line L7 with respect to the tire width direction is θ7, θ7≥14°; further provided that the intermediate value of a radius of curvature of the carcass 5 within a 6th height range h6 ranging from the $5^{th}$ height position 1-15 to the $6^{th}$ height position H6 is R6, R6<R7 (R7 is the radius of curvature of the carcass 5 within the $7^{th}$ height range h7, as defined above); further provided that a radius of curvature of the carcass within a $5^{th}$ height range h5 ranging from the $4^{th}$ height position H4 to the 5 h height position H5 is R5, R5>R6 (R6 is the intermediate value of a radius of curvature of the carcass 5 within the $6^{th}$ height range h6, as defined above); and further provided that a line linking the innermost and the outermost positions on the carcass, in the tire radial direction, in the $5^{th}$ height range h5 (i.e. a line linking imaginary points on the carcass at the $4^{th}$ height position H4 and the $5^{th}$ height position H5) is L5 and an acute inclination angle formed by the line L5 with respect to the tire radial direction is θ5, θ5≤23°.

According to the aforementioned structure of the carcass 5, it is possible, as described below in detail, to reduce displacement of a tire in the tire width direction when the tire is imparted with a slip angle (in a cornering situation of a vehicle, or the like), so that it takes a shorter time for cornering force to diminish to a normal state, i.e. responsiveness of the vehicle in a cornering situation improves. Further, a decrease in displacement in the tire width direction of a tire makes a ground-contact configuration of the tire resemble a rectangle, thereby allowing shearing force to be uniformly generated within the ground-contact surface of the tire and thus increasing cornering force, so that only a small steering angle is needed and controllability and stability of the tire significantly improve.

"The maximum height (h) in the tire radial direction of the carcass 5" represents a distance in the tire radial direction, measured from the innermost position H0 to the outermost position in the tire radial direction of the carcass 5. "The intermediate value R6 of a radius of curvature" represents the exactly intermediate value between the lowest value and the highest value, i.e. (the lowest value+the highest value)/2, of a radius of curvature of the carcass 5 within the 6$^{th}$ height range h6. In a case where the carcass 5 includes a plurality of carcass ply layers, an imaginary middle line extending exactly in the middle of the radially outermost carcass ply and the radially innermost carcass ply should be referred to when a radius of curvature of the carcass 5, the position of an imaginary point on the carcass 5, a height position in the carcass 5, and the like are to be measured.

The respective portions of the carcass 5 having the radii of curvatures 1R7 and R6 each have the curvature center thereof on the tire inner side with respect to the carcass 5 portion.

Figure 2:
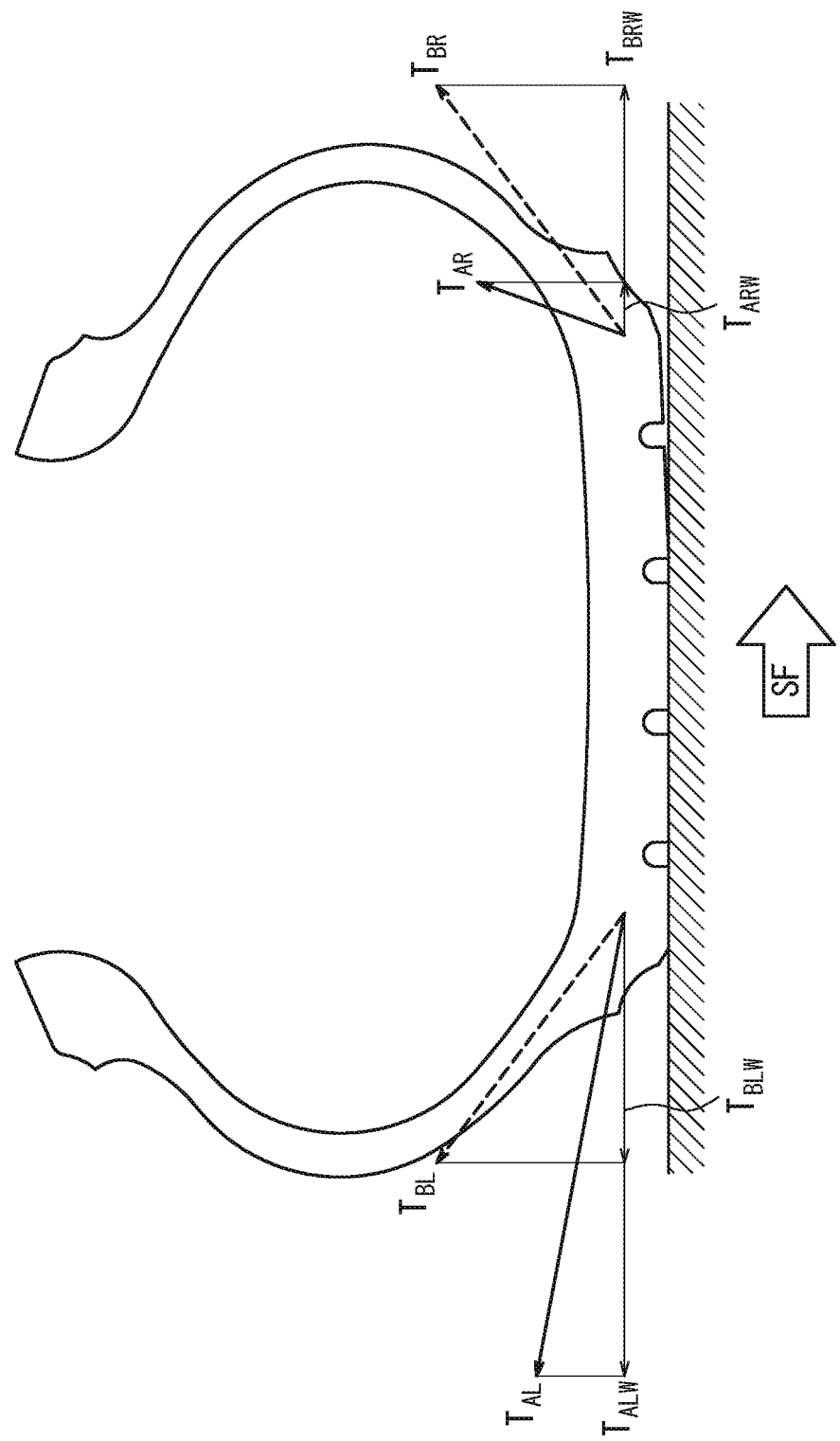
FIG. 2 is a cross sectional view in the tire width direction, for explaining an effect of the pneumatic tire of FIG. 1.

Lateral springs of a tire when the tire is imparted with a slip angle in a cornering situation or the like of a vehicle will be described with reference to FIG. 2. FIG. 2 shows a tire in a state where side force SF is being exerted thereon in the tire width direction. A side portion as the SF acting side (the left-hand side in FIG. 2) of the tire sinks towards the ground surface, while a side portion opposite to the side force SF acting side (the right-hand side in FIG. 2) of the tire is deformed to float up from the ground surface, in the state. The dotted line arrows $T_{BL}$, $T_{BR}$ represent vectors of tension forces acting on the respective side portions in the tire width direction of the carcass 5 when the side force SF is not being exerted on the tire, respectively, and the solid line arrows $T_{AL}$, $T_{AR}$ represent vectors of tension forces acting on the respective side portions in the tire width direction of the carcass 5 when the side force SF is being exerted on the tire, respectively. Directions and lengths of the arrows represent the directions and the magnitudes of force of the tension force vectors $T_{BL}$, $T_{BR}$, $T_{AL}$ and $T_{AR}$, respectively. Tension forces acting on portions from the respective ends in the tire width direction of the tread portion 1 to the bead portions 3, of the carcass 5, which tension forces are actually primary factors affecting cornering force, will be comprehensively referred to, for convenience' sake, as "tension force vectors $T_{BL}$, $T_{BR}$, $T_{AL}$ and $T_{AR}$, acting on the respective side portions in the tire width direction of the carcass 5" in the present disclosure. Tension forces acting on positions of the carcass 5 are oriented in the tangential directions of the carcass 5 at the positions, respectively.

Cornering force can be expressed as "$(T_{ALW}+T_{ARW})-(T_{BLW}+T_{BRW})$", wherein the sum of the tire widthwise components of tension force vectors acting on the respective side portions in the tire width direction of the carcass 5 before exertion of the side force SF is "$(T_{BLW}+T_{BRW})$" and the sum of the tire widthwise components of tension force vectors acting on the respective side portions in the tire width direction of the carcass 5 after exertion of the side force SF is "$(T_{ALW}+T_{ARW})$". The direction of the cornering force (the right-to-left direction in FIG. 2), which is opposite to the direction of the side force SF, is regarded as the positive direction of a vector in the present disclosure.

The radius of curvature R7 of the carcass 5 within the 7$^{th}$ height range h7 is set such that R7≥0.26 h, whereby the carcass 5 extends satisfactorily straight in the 7$^{th}$ height range h7 and satisfactorily high tension force acting on the carcass 5 is ensured. Further, the intermediate value R6 of a radius of curvature of the carcass 5 within the 6$^{th}$ height range h6 is set such that R6<R7, and the radius of curvature R5 of the carcass 5 within the 5$^{th}$ height range h5 and the aforementioned acute inclination angle θ5 with respect to the tire radial direction is set such that R5>R6 and θ5≤23°, whereby the carcass 5 bulges on the tire inner side (the tire inner cavity side) in the 6$^{th}$ height range h6 when the tire is inflated and deformed to be round, so that the carcass 5 extends satisfactorily straight in the 6$^{th}$ height range h6 when the tire is inflated at the normal maximum internal pressure and thus satisfactorily high tension force acting on the carcass 5 is ensured in the 6$^{th}$ height range h6. Tension force acting on the carcass 5 represents, in other words, rigidity or resistance to deformation, of the carcass 5. It is possible to increase the tension force vector $T_{AL}$ generated on the carcass 5 on the side force (SF) acting side and decrease the tension force vector $T_{AR}$ generated on the carcass 5 on the side opposite to the SF acting side when the side force SF is exerted on the tire, by enhancing tension force acting on the carcass 5 in the 7$^{th}$ height range h7 and the 6$^{th}$ height range h6, thereby successfully increasing the lateral spring constant of the tire to reduce a magnitude of lateral displacement when the tire is imparted with a slip angle.

Yet further, the acute inclination angle θ7 of the carcass 5 formed with respect to the tire width direction in the 7$^{th}$ height range h7 is set such that θ7≥14°, whereby the crown region of the carcass 5 can be significantly deformed to extend in the tire width direction (i.e. lie down along the ground surface) on the side force acting side when the side force SF is exerted on the tire. As a result, the tension force vector $T_{AL}$ is rotation-displaced to further be aligned with the tire width direction. On the other hand, the crown region of the carcass 5 is significantly deformed to extend in the tire radial direction (i.e. rise up from the ground surface) on the side opposite to the SF acting side, whereby the tension force vector $T_{AR}$ is rotation-displaced to further be aligned with the tire radial direction. In short, the lateral spring constant of the tire can be further increased by this structure.

According to the tire of the present disclosure, the unique structure of the carcass 5 by itself increases the lateral spring constant of the tire when side force is exerted on the tire, whereby responsiveness of a vehicle in a cornering situation significantly improves and only a small steering angle is needed for making a turn due to an increase in cornering force resulted from a decrease in the magnitude of lateral displacement, so that controllability and stability of the tire significantly improve without requiring provision of an additional member, as described above.

A member may be additionally provided, however, to the tire of the present disclosure in order to enhance rigidity of a sidewall portion, for example, although controllability and stability of the tire can be improved without provision of an additional member, as described above. In this case, controllability and stability of the tire will further improve, although rolling resistance thereof may be sacrificed to some extent.

The radius of curvature R7 of the carcass 5 within the 7$^{th}$ height range h7 is preferably R7≥0.361 h, the acute inclination angle θ7 of the carcass 5 formed with respect to the tire width direction in the 7$^{th}$ height range h7 is preferably θ7≥18°, and the acute inclination angle θ5 of the carcass 5 formed with respect to the tire radial direction within the 5$^{th}$ height range h5 is preferably θ5≤18° in terms of increasing the cornering force described above.

On the other hand, the radius of curvature R7 of the carcass 5 within the 7$^{th}$ height range h7 is preferably R7≤0.72 h in terms of preventing breakage of the carcass from occurring and the acute inclination angle θ7 of the carcass 5 formed with respect to the tire width direction in the 7$^{th}$ height range h7 is preferably θ7≤16° in terms of ensuring good durability of the belt. Further, the acute inclination angle θ5 of the carcass 5 formed with respect to the tire radial direction within the 5$^{th}$ height range h5 is preferably θ5≥9° in terms of preventing breakage of the carcass from occurring.

The intermediate value R6 of a radius of curvature of the carcass 5 within the 6$^{th}$ height range h6 is preferably in the range of 0.13 h≤R6≤0.26 h. If R6≤0.13 h, the carcass 5 exceedingly bulges toward the tire inner cavity side in the 6$^{th}$ height range h6 when the tire is inflated, whereby side rubber in the 6$^{th}$ height range experiences significantly large strain and is made susceptible to cracks when the tire is inflated at the normal maximum internal pressure. If R6>0.26 h, the carcass 5 fails to bulge toward the tire inner cavity side in a satisfactory manner in the 6$^{th}$ height range h6 when the tire is inflated, whereby the carcass 5 cannot extend satisfactorily straight in the 6$^{th}$ height range h6 and thus satisfactorily high tension force acting on the carcass 5 is not ensured therein when the tire is inflated at the normal maximum internal pressure. In other words, it is possible to reliably improve controllability and stability of the tire, with ensuring satisfactory durability thereof, by setting R6 to be 0.13 h≤R6≤0.26 h. It is further preferable to set the intermediate value R6 of a radius of curvature of the carcass 5 within the 6$^{th}$ height range h6 such that R6=0.155 h, for similar reasons.

The radius of curvature R5 of the carcass 5 within the 5$^{th}$ height range h5 is preferably R5≥0.82 h. It is possible to further increase tension force acting on the carcass 5 in the 5$^{th}$ height range h5 by this structure, thereby further increasing the tension force vector $T_{AL}$ generated in the carcass 5 on the side force acting side when the tire is imparted with a slip angle and lateral displacement occurs, to further improve controllability and stability by better responsiveness of a vehicle in a cornering situation resulting from an increase in the lateral spring constant of the tire. It is further preferable to set the radius of curvature R5 of the carcass 5 within the 5$^{th}$ height range h5 such that R5≥1.031 h, for similar reasons.

Provided that a position distanced on the outer side in the tire radial direction from the innermost position H0 in the tire radial direction of the carcass 5 by 0.48 h is referred to as a 3$^{rd}$ height position H3 and that a radius of curvature of the carcass 5 within a 4$^{th}$ height range h4 ranging from the 3$^{rd}$ height position H3 to the 4$^{th}$ height position H4 is R4, it is preferable that R4≥0.39 h and the maximum width position CWH of the carcass 5 is located within the 4$^{th}$ height range h4. "The maximum width position CWH of the carcass 5" represents each of the respective (height) positions in the tire radial direction at which a distance in the tire width direction between the carcass 5 portions of the pair of the sidewall portions 2 is largest. In a case where the maximum width position CWH of the carcass 5 is located within the 4$^{th}$ height range h4, tension force vectors acting on the carcass 5 in the 7$^{th}$ to the 5$^{th}$ height ranges h7-h5 are oriented toward the outer side in the tire width direction, thereby satisfactorily causing an effect of increasing the lateral spring constant described above. The maximum width position CWH of the carcass 5 is more preferably located at a position distanced on the outer side in the tire radial direction from the innermost position H0 in the tire radial direction of the carcass 5 by 0.55 h, for the same reason. Further, setting the radius of curvature R4 of the carcass 5 within the 4$^{th}$ height range h4 such that R4≥0.39 h increases cornering force. Setting the radius of curvature R4 of the carcass 5 within the 4$^{th}$ height range h4 such that R4≥0.464 h is more preferable, for the same reason.

R7, R6, R5 and R4 may either be constant or change within the respective height ranges h7, h6, h5 and h4, as long as R7, R6, R5 and R4 satisfy the aforementioned conditions, respectively.

Provided that a distance in the tire width direction between respective bead heals 3a of the pair of bead portions 3 in a state where the tire has been assembled with a prescribed rim R and inflated at the normal maximum inner pressure with no load applied thereon is W and that the maximum width in the tire width direction of the carcass 5 is CW, it is preferable that CW≤1.35×W. "The maximum width CW in the tire width direction of the carcass 5" represents a width in the tire width direction between the respective outermost positions in the tire width direction of the carcass 5. The aforementioned structure allows the main body portion 5a of the carcass 5 to extend satisfactorily straight in each sidewall portion 2, thereby well suppressing a decrease in tension force in the main body portion 5a and thus deformation of the tire when lateral force is exerted on the tire, so that controllability and stability of the tire significantly improve.

It is preferable in a state where the tire has been assembled with a prescribed rim R but substantially has not been inflated with no load applied thereon that an outer surface of the tire has a recessed portion 10 dented toward the tire inner side in a region on the inner side in the tire radial direction of the tire maximum width position SWH and on the outer side in the tire radial direction of a rim separating point S where the outer surface of the bead portion 3 separates itself from a rim flange Rf, as shown in FIG. 1. "The tire maximum width position SWH" represents each of the respective (height) positions in the tire radial direction at which a distance in the tire width direction between the tire outer surfaces of the pair of the sidewall portions 2 is largest. The tire maximum width position SWH is located at the same position as the maximum width position CWH of the carcass 5, in the example of FIG. 1. Formation of the recessed portion 10 reduces an amount of rubber in the tire, as compared with a case where the tire lacks the recessed portion 10, thereby well decreasing weight, rolling resistance and fuel consumption rate of the tire.

Provided that height positions distanced on the outer side in the tire radial direction from the innermost position H0 in the tire radial direction of the carcass 5 by 0.26 h and 0.10 h are referred to as a 2$^{nd}$ height position H2 and a 1$^{st}$ height position H1, respectively, and that a radius of curvature of the carcass 5 in a region in a 2$^{nd}$ height range h2 ranging from the 1$^{st}$ height position H1 to the 2$^{nd}$ height position H2 and on the outer side in the tire radial direction of the bead core 4 is R2 in FIG. 1, it is preferable that R2≥0.46 h. Further, it is preferable that a radius of curvature R3 of the carcass 5 in a 3$^{rd}$ height range h3 ranging from the 2$^{nd}$ height position H2 to the 3$^{rd}$ height position H3 is equal to larger than 0.62 h, i.e. R3≥0.62 h. It is possible to satisfactorily suppress deformation of the tire by lateral force in the 3$^{rd}$ height range h3 and the 2$^{nd}$ height range h2, thereby improving controllability and stability of the tire, by the aforementioned structure.

R3 and R2 may either be constant or change within the aforementioned numerical ranges in the height ranges h3 and h2, respectively. The aforementioned region "in the 2$^{nd}$ height range h2 and on the outer side in the tire radial direction of the bead core 4" represents a region where the 2$^{nd}$ height range h2 and a region on the outer side in the tire radial direction of the bead core 4 (i.e. a region on the outer side in the tire radial direction than the radially outermost position of the bead core 4) overlap each other. A "radius of curvature of the carcass 5" represents a radius of curvature of the main body 5a of the carcass 5.

The carcass 5 portion having the radius curvature R2 (i.e. the carcass 5 portion in the 2nd height range h2 and on the outer side in the tire radial direction of the bead core 4) may have the curvature center thereof on the tire outer side (the outer surface side of the tire) with respect to the carcass 5 portion in the $2^{nd}$ height range h2, although the carcass 5 portion has the curvature center thereof on the tire inner side with respect to the carcass 5 portion in the $2^{nd}$ height range h2 in the example of FIG. 1. Further, the carcass 5 portion having the radius curvature R3 (i.e. the carcass 5 portion in the $3^{rd}$ height range h3) has the curvature center thereof on the tire inner side with respect to the carcass 5 portion in the $3^{rd}$ height range h3 in the example of FIG. 1

Yet further, it is more preferable that the radius curvature R2 of the carcass 5 is equal to larger than 0.51 h, i.e. R2≥0.51 h, in the $2^{nd}$ height range h2 and on the outer side in the tire radial direction of the bead core 4 and the curvature center of R2 is located on the tire inner side with respect to the carcass 5. It is possible to further increase tension force acting on the carcass 5 in the $2^{nd}$ height range h2 by this structure, thereby further suppressing deformation of the tire by lateral force therein.

Provided that: "P" represents an imaginary point on the carcass 5; "Gn" represents a gauge of the tire at the imaginary point P, measured along a line drawn to be normal to the carcass 5 at the imaginary point P; "bead core height position Hbc" represents a height position in the tire radial direction of the imaginary point P, measured from the innermost position H0 in the tire radial direction of the carcass 5, which position is the outermost height position that can be taken by the imaginary point P when the line drawn to be normal to the carcass 5 at the point P should pass through the bead core 4; and "G0" represents a gauge of the tire at the imaginary point P when the point P is located at the bead core height position Hbc, it is preferable that the gauge Gn of the tire, measured along a line drawn to be normal to the carcass 5 at the imaginary point P, decreases at a decreasing rate of 0.025× G0/mm or less, as the imaginary point P moves along the carcass 5 from the bead core height position Hbc to the $3^{rd}$ height position H3. Further, the minimum value of the gauge Gn, exhibited as the imaginary point P moves along the carcass 5 from the bead core height position Hbc to the $3^{rd}$ height position H3, is preferably ≥10% of the largest width Wc in the tire width direction of the bead core 4. It is possible by this structure to ensure a satisfactorily large gauge Gn of the tire in a region between the bead core height position Hbc and the $3^{rd}$ height position H3 and suppress generation of a portion which could be a fulcrum (node) point of bending when lateral force is exerted on the tire, thereby well improving controllability and stability of the tire.

In the present disclosure, "the outermost height position Hbc in the tire radial direction of the imaginary point P, measured from the innermost position H0 in the tire radial direction of the carcass 5, which position Hbc is the outermost height position that can be taken by the imaginary point P when the line drawn to be normal to the carcass 5 at the point P should pass through the bead core 4" represents a height position of an imaginary point P on the carcass 5, measured from the innermost position H0 in the tire radial direction of the carcass 5 toward the outer side in the tire radial direction, when the imaginary point P is selected such that the point P resides at the outermost height position that can be taken by the point P when the line drawn to be normal to the carcass 5 at the point P should pass through the bead core 4. Further, "the gauge Gn . . . decreases at a decreasing rate of 0.025×G0/mm or less" represents that 0<(the decreasing rate of the gauge Gn per 1 mm when the imaginary point P moves along the carcass 5)≤0.025×G0. Yet further, "the largest width Wc in the tire width direction of the bead core 4" represents a length in the tire width direction, of the bead core 4, measured between the outermost position and the innermost position in the tire width direction thereof.

The carcass 5 further includes a turn-up portion 5, as shown in FIG. 1. It is preferable that the terminal end of the turn-up portion 5 of the carcass 5 is located on the inner side in the tire radial direction of the outermost position in the tire radial direction of the rim flange Rf. It is more preferable that the turn-up portion 5b of the carcass 5 includes a wound-up portion 5c wound around a periphery surface of the bead core 4. It is possible by these structures to increase the size of the recessed portion 10 formed in an outer surface of the tire, which contributes to further reduction of weight and thus rolling resistance of the tire. Further, it is possible by the wound-up portion 5c to prevent the carcass 5 from being pulled out from the periphery of the bead core 4.

Provided that a line linking the innermost and the outermost positions in the tire radial direction, on the carcass, in the $3^{rd}$ height range h3 (i.e. a line linking the imaginary points on the carcass 5 at the $2^{nd}$ height position H2 and the $3^{rd}$ height position H3) is L3 and an acute inclination angle formed by the line L3 with respect to the tire 5 radial direction is θ3, it is preferable that θ3≤27°. This structure allows the carcass 5 to extend satisfactorily straight in the $3^{rd}$ height range h3 when the tire is inflated at the normal maximum internal pressure, thereby ensuring satisfactorily high tension force acting on the carcass 5 in the $3^{rd}$ height range h3.

EXAMPLES

Examples of the tire according to the present disclosure will be described hereinafter. Test tires of Examples 1 to 9 and Comparative Examples 1 to 6 having the relevant characteristics, respectively, were prepared as shown in Table 1 and controllability and stability thereof were evaluated. The test tires, each having the tire size: 275/80R22.5 and a structure as shown in FIG. 1, were different from each other only in the characteristics shown in Table 1. The characteristics "R7/h", "R6/h", "R5/h", "R4/h", "θ7", and "θ5" shown in Table 1, of each test tire, were measured in a state where the tire was assembled with a prescribed rim and inflated at internal pressure: 50 kPa with no load applied thereon, respectively.

Each of the test tires was assembled with a rim having size: 22.5×7.5, inflated at internal pressure: 900 kPa, mounted on a vehicle, and run on a test course having a dry road surface. Controllability and stability of the tire were evaluated by a driver based on how he/she felt. The evaluation results are shown as relative indices in Table 1. The larger index values represents the better controllability and stability of the tire.

TABLE 1

|  | Com. Example 1 tire | Com. Example 2 tire | Com. Example 3 tire | Com. Example 4 tire | Com. Example 5 tire | Com. Example 6 tire | Example 1 tire | Example 2 tire |
|---|---|---|---|---|---|---|---|---|
| R7/h | 0.21 | 0.42 | 0.42 | 0.42 | 0.42 | 0.42 | 0.36 | 0.42 |
| R6/h | 0.24 | 0.48 | 0.24 | 0.24 | 0.24 | 0.24 | 0.24 | 0.15 |
| R5/h | 0.82 | 0.82 | 0.68 | 0.82 | 0.82 | 0.82 | 0.82 | 0.82 |
| R4/h | 0.39 | 0.39 | 0.39 | 0.26 | 0.39 | 0.39 | 0.39 | 0.39 |
| θ7 | 14 | 14 | 14 | 14 | 9 | 14 | 14 | 14 |
| θ5 | 23 | 23 | 23 | 23 | 23 | 27 | 23 | 23 |
| Controllability and stability (Index) | 91 | 91 | 91 | 91 | 100 | 82 | 109 | 109 |

|  | Example 3 tire | Example 4 tire | Example 5 tire | Example 6 tire | Example 7 tire | Example 8 tire | Example 9 tire |
|---|---|---|---|---|---|---|---|
| R7/h | 0.42 | 0.42 | 0.42 | 0.42 | 0.36 | 0.26 | 0.26 |
| R6/h | 0.24 | 0.24 | 0.24 | 0.24 | 0.15 | 0.24 | 0.24 |
| R5/h | 1.03 | 0.82 | 0.82 | 0.82 | 1.03 | 0.68 | 0.82 |
| R4/h | 0.39 | 0.46 | 0.39 | 0.39 | 0.46 | 0.39 | 0.39 |
| θ7 | 14 | 14 | 18 | 14 | 18 | 14 | 14 |
| θ5 | 23 | 23 | 23 | 18 | 18 | 23 | 23 |
| Controllability and stability (Index) | 109 | 109 | 118 | 127 | 172 | 109 | 118 |

As is obvious from the results shown in Table 1, the test tires of Examples 1 to 9 unanimously exhibit significantly improved controllability and stability, as compared with the test tires of Comparative Examples 1 to 6. It is therefore understood that the pneumatic tire of the present disclosure can improve controllability and stability without necessitating provision of an additional member therein.

INDUSTRIAL APPLICABILITY

The tire of the present disclosure is applicable to pneumatic tires of various types including a pneumatic tire for a heavy-load vehicle such as a truck, a bus or the like.

REFERENCE SIGNS LIST

1 Tread portion
1a Circumferential groove
2 Sidewall portion
3 Bead portion
3a Bead heal
4 Bead core
5 Carcass
5a Main body portion
5b Turn-up portion
5c Wound-up portion
6 Belt
7 Tread rubber
10 Recessed portion
20 Shoulder region
C Tire equatorial plane
CW Maximum width in tire width direction of carcass
CWH Maximum width position of carcass
G0, Gn Gauge
h Maximum height in tire radial direction of carcass
h2-h7 Height range
H0 Innermost position in tire radial direction of carcass
H0-H7 Height position
Hbc Bead core height position
SWH Tire maximum width position
P Imaginary point
R Prescribed rim
Rf Rim flange
R2-R7 Radius of curvature
S Rim separating point
SF Side force
W Distance in tire width direction between bead heals
Wc Maximum width in tire width direction of bead core

The invention claimed is:

1. A pneumatic tire having a pair of bead portions, a pair of bead cores embedded in the bead portions, respectively, and a carcass including at least one layer of carcass ply extending in a toroidal shape across the pair of bead cores, wherein:

in a cross section in the tire width direction of the tire in a state where the tire has been assembled with a prescribed rim but substantially has not been inflated, with no load applied thereon, provided that the maximum height in the tire radial direction of the carcass, measured from the innermost position in the tire radial direction thereof, is h and that positions distanced on the outer side in the tire radial direction from the innermost position in the tire radial direction of the carcass by h, 0.91 h, 0.82 h, and 0.63 h, respectively, are a $7^{th}$ height position H7, a $6^{th}$ height position H6, a $5^{th}$ height position H5, and a $4^{th}$ height position H4, respectively, further provided that a radius of curvature of the carcass within a $7^{th}$ height range h7 ranging from the $6^{th}$ height position H6 to the $7^{th}$ height position H7 is R7, R7≥0.26 h;

further provided that an imaginary point on the carcass at the $6^{th}$ height position H6 is P6, an imaginary point on the carcass at a tire widthwise position distanced by 0.4 h on the inner side in the tire width direction from the outermost position in the tire width direction of the carcass is $P_{0.4\,h}$, a line linking the imaginary points P6 and $P_{0.4\,h}$ is L7, and an acute inclination angle formed by the line L7 with respect to the tire width direction is θ7, θ7≥14°;

further provided that the intermediate value of a radius of curvature of the carcass within a $6^{th}$ height range h6 ranging from the $5^{th}$ height position H5 to the $6^{th}$ height position H6 is R6, R6<R7;

further provided that a radius of curvature of the carcass within a 5$^{th}$ height range h5 ranging from the 4$^{th}$ height position H4 to the 5$^{th}$ height position H5 is R5, R5>R6;

further provided that a line linking the innermost and the outermost positions in the tire radial direction, on the carcass, in the 5$^{th}$ height range h5 is L5 and an acute inclination angle formed by the line L5 with respect to the tire radial direction is θ5, θ5≤23°, and wherein the radius of curvature R5 of the carcass within the 5$^{th}$ height range h5 is ≥0.82 h.

2. The pneumatic tire of claim 1, wherein the intermediate value R6 of a radius of curvature of the carcass within the 6$^{th}$ height range h6 is in the range of 0.13 h to 0.26 h.

3. The pneumatic tire of claim 1, wherein, provided that a position distanced on the outer side in the tire radial direction from the innermost position in the tire radial direction of the carcass by 0.48 h is a 3$^{rd}$ height position H3 and that a radius of curvature of the carcass within a 4$^{th}$ height range h4 ranging from the 3$^{rd}$ height position H3 to the 4$^{th}$ height position H4 is R4, R4≥0.39 h, and the maximum width position of the carcass is located within the 4$^{th}$ height range h4.

\* \* \* \* \*